US007985381B2

United States Patent
Sun et al.

(10) Patent No.: US 7,985,381 B2
(45) Date of Patent: Jul. 26, 2011

(54) UTILIZATION OF BAFFLES IN CHLORINATION ZONE FOR CONTINUOUS CATALYST REGENERATION

(75) Inventors: Bing Sun, Des Plaines, IL (US); Paul Alvin Sechrist, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 353 days.

(21) Appl. No.: 12/366,729

(22) Filed: Feb. 6, 2009

(65) Prior Publication Data
US 2010/0202940 A1    Aug. 12, 2010

(51) Int. Cl.
*B01J 19/18*  (2006.01)
*B01J 35/02*  (2006.01)
*B01J 23/90*  (2006.01)
*B01J 23/96*  (2006.01)

(52) U.S. Cl. ........ 422/228; 422/211; 422/220; 422/223; 208/140

(58) Field of Classification Search ........... 422/211, 422/220, 223, 228; 208/140
See application file for complete search history.

(56) References Cited

U.S. PATENT DOCUMENTS

| 5,397,458 A | 3/1995 | Micklich et al. |
| 5,498,756 A | 3/1996 | Micklich et al. |
| 5,882,610 A | 3/1999 | Darmancier et al. |
| 6,059,961 A * | 5/2000 | Koves et al. ............ 208/146 |
| 6,093,373 A | 7/2000 | Darmancier et al. |
| 6,569,389 B1 * | 5/2003 | Koves et al. ............ 422/219 |
| 6,881,391 B1 | 4/2005 | Sechrist |
| 2001/0055548 A1 | 12/2001 | Harter et al. |

FOREIGN PATENT DOCUMENTS
GB    1 274 327 A    5/1972

\* cited by examiner

*Primary Examiner* — Walter D Griffin
*Assistant Examiner* — Natasha Young
(74) *Attorney, Agent, or Firm* — Mark Goldberg

(57) ABSTRACT

Catalyst regeneration vessels including a chlorination zone that includes an outer mixing chamber, an inner mixing chamber, and a catalyst bed. The outer mixing chamber can include a lower portion and an upper portion, the lower portion of the outer mixing chamber including at least one air nozzle that injects a drying air stream into the outer mixing chamber, at least one chlorine input nozzle that injects a chlorine input stream into the outer mixing chamber, and at least a first baffle. The chlorination zone can also contain a second baffle that directs the mixed drying air stream and chlorine input stream from the outer mixing chamber to the inner mixing chamber.

2 Claims, 2 Drawing Sheets

UTILIZATION OF BAFFLES IN CHLORINATION ZONE FOR CONTINUOUS CATALYST REGENERATION

FIELD OF THE INVENTION

The systems and processes described herein generally relate to the art of reconditioning of spent hydrocarbon conversion catalyst so that the catalyst can be reused in a hydrocarbon conversion reaction, and more specifically to directing and controlling the distribution and flow of streams within a catalyst regeneration tower.

DESCRIPTION OF RELATED ART

Catalytic processes for the conversion of hydrocarbons are well known and extensively used. Invariably the catalyst used in these processes become deactivated for one of more reasons. Where the accumulation of coke deposits causes the deactivation. reconditioning of the catalyst to remove coke deposits restores the activity of the catalyst. Coke is normally removed from catalyst by a regeneration operation that contacts the coke containing catalyst at high temperature with an oxygen-containing gas to combustively remove the coke. Regeneration may be carried out in-situ or the catalyst may be removed from a vessel in which the hydrocarbon conversion takes place and transported to a separate regeneration vessel for coke removal. Arrangements for continuously or semi-continuously removing catalyst particles from a reaction zone for coke removal in a regeneration vessel are well known.

In continuous or semi-continuous catalyst regeneration processes, coke laden particles are at least periodically added and withdrawn from a bed of catalyst in a regeneration vessel in which the coke is combusted. Regions of intense burning that extend through portions of the catalyst bed develop as the coke is combusted. After this intense burning, certain catalysts require reconditioning to restore its effectiveness. For example reforming catalysts typically contain chloride compounds and noble metals, usually platinum. These catalysts require reconditioning to restore the activity of the noble metal to its most highly catalytic state and to replace chloride on the catalyst that may be lost in the reaction zone or through the combustion of coke. Reconditioning for a reforming catalyst generally includes contact with a chloride containing compound in a chlorination zone of the regeneration vessel, to redistribute the platinum metal and replace the chloride that may be lost from the catalyst, followed by a drying step to reduce the moisture content of the catalyst and finally a reducing step to change the platinum metal from various oxidized states to a reduced metallic condition.

SUMMARY OF THE INVENTION

The systems and processes described herein relate to directing and controlling the flow of gas streams within the chlorination zone of a catalyst regeneration vessel.

In one aspect a chlorination zone in a catalyst regeneration vessel is provided that includes an outer mixing chamber, an inner mixing chamber, and a catalyst bed. The outer mixing chamber is at an outer edge of the chlorination zone. The outer mixing chamber can include a lower portion and an upper portion. The lower portion of the outer mixing chamber can include at least one air nozzle that injects a drying air stream into the outer mixing chamber, at least one chlorine input nozzle that injects a chlorine input stream into the outer mixing chamber, and at least a first baffle. The catalyst bed can be in a center of the chlorination zone. The inner mixing chamber can be interposed between the outer mixing chamber and the catalyst bed.

In another aspect, a chlorination zone in a catalyst regeneration vessel is provided that includes an outer wall, a downwardly extending chlorination zone wall, and an upwardly extending chlorination wall that is interposed between the downwardly extending chlorination zone wall and the outer wall. An outer mixing chamber can be defined by the outer wall and the upwardly extending chlorination wall. The outer mixing chamber can include a lower portion and an upper portion. The lower portion of the outer mixing chamber can include at least one air nozzle that injects a drying air stream into the outer mixing chamber, at least one chlorine input nozzle that injects a chlorine input stream into the outer mixing chamber, and at least a first baffle. An inner mixing chamber can be defined by the downwardly extending chlorination wall and the upwardly extending chlorination wall. A second baffle can be located above upwardly extending chlorination wall.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
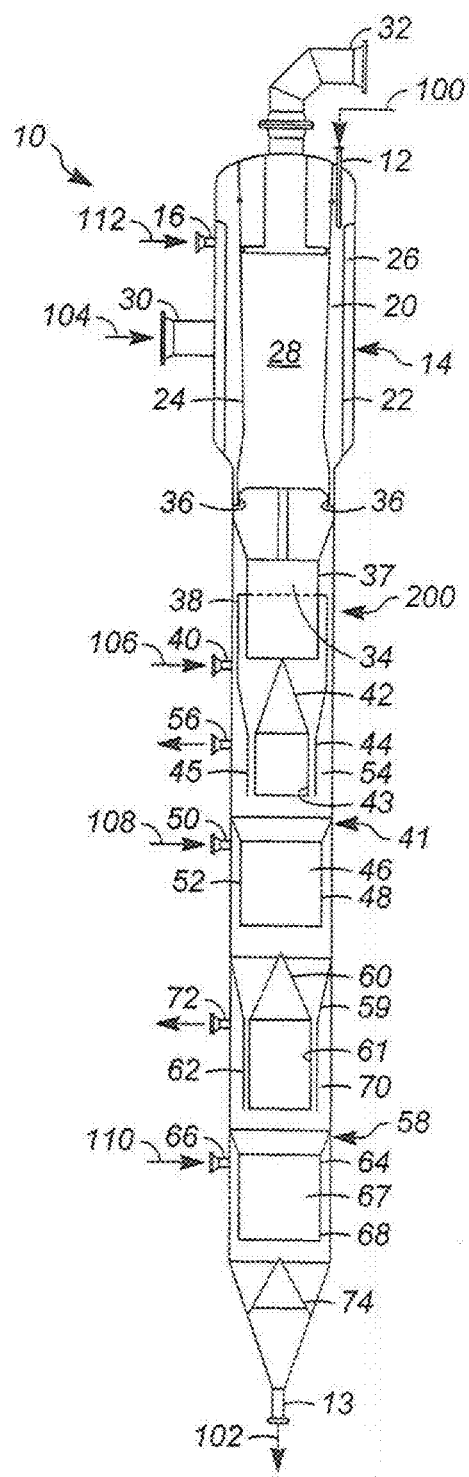
FIG. 1 illustrates a sectional view of a catalyst regeneration vessel.

FIG. 1 illustrates a sectional view of a catalyst regeneration vessel 10. A spent catalyst stream 100, containing spent catalyst particles, can be introduced into the regeneration vessel 10 through one or more inlet pipes, such as catalyst inlet pipe 12. The spent catalyst particles contain coke, and can contain, for example, about 5% by weight coke. A regenerated catalyst stream 102, containing regenerated catalyst, exits the regeneration vessel 10 through a bottom nozzle 13. The withdrawal of regenerated catalyst stream 102 from bottom nozzle 13 can control the flow rate of catalyst through the catalyst regeneration vessel 10, and may be either continuous or intermittent. The arrangement of catalyst regeneration vessel 10 can provide a continuous downward catalyst flow path through the regeneration vessel 10. Preferably, the entire volume of the continuous catalyst flow path within the catalyst regeneration vessel 10 remains full of catalyst during the operation of the catalyst regeneration vessel 10.

Regeneration vessel 10 can have an upper combustion zone 14. Spent catalyst particles can be distributed from the one or more catalyst inlet pipes 12 into a catalyst bed 20. The regeneration vessel 10 can preferably be cylindrical, and catalyst bed 20 can have the configuration of an extended annulus. An outer cylindrical screen 22 and an inner cylindrical screen 24 can retain the spent catalyst particles in the arrangement of an extended annular bed. Preferably, one or both of screens 22 and 24 give the bed a tapered configuration. An annular space just inside the shell of regeneration vessel 10 and to the outside of screen 22 can define an inlet chamber 26 for receiving an oxygen-containing regeneration gas 104. The volume to the inside of screen 24 can define a central collection chamber 28. The oxygen-containing regeneration gas 104, or recycle gas, can enter the inlet chamber 26 through a nozzle 30. The oxygen-containing regeneration gas 104 can flow through bed 20 and can exit the combustion zone 14 from the collection chamber through an upper nozzle 32 located in an upper portion of combustion section 14. One or more seal gas inlets 16 can be utilized to inject seal gas 112 into the gas space above the catalyst at the bottom of the one or more catalyst inlet pipes 12. The seal gas stream 112 can have the same composition as the regeneration gas 104. The seal gas stream 112 can flow downwardly through the catalyst, exit into the central collection chamber 28, and mix with the regeneration gas 104. Removal of coke by combustion in the combustion zone 14 can produce spent catalyst particles that are coke depleted.

The spent catalyst particles can flow downwardly from bed 20 of the combustion zone 14 into a chlorination zone 200 that holds catalyst as a dense bed 34. The spent catalyst particles can pass from screen outlets 36 into an open volume defined by a downwardly extending chlorination zone wall 37 that forms the dense bed 34. A chlorination gas, which can comprise a mixture of a chlorine compound input stream 106 and a drying gas 108, can pass through a two pass baffle system 38 before entering the bottom of dense bed 34 of the chlorination zone 200. The chlorine compound input stream 106 can enter baffle system 38 through at least one chlorine input nozzle 40. Optionally, the regeneration vessel 10 can have two chlorine input nozzles 40, which can preferably be located at positions on opposite sides of the regeneration vessel, and at angle of about 180° from each other. Preferably the chlorine input stream 106 is in vapor form to prevent the entry of acid droplets into the baffle system 38. A small vaporizing heater may be added upstream of at least one chlorine input nozzle 40 to insure that the chlorine compound input stream 106 is fully vaporized.

Chlorination gas, after contact with the catalyst particles in dense bed 34 of the chlorination zone 200, can pass upwardly into central collection chamber 28. As the chlorination gas passes into upper collection chamber 28, it can furnish oxygen to the spent regeneration gas for return to the combustion zone with the recycle gas to thereby supply the oxygen needed for further combustion of coke from the catalyst particles.

The chlorination zone 200 produces chlorided catalyst, which can flow downwardly to the drying zone 41 from the dense bed 34 by flowing around a conical baffle 42, into an annular holdup zone 45 defined by a lower cylindrical portion 43 of conical baffle 42 and a lower cylindrical portion of truncated conical baffle 44. An annular volume of catalyst retained between baffles 44 and 43 can provide a gas seal to limit the flow of drying gas upwardly through the catalyst particles into dense bed 34. Catalyst particles that leave annulus 45 form a central dense bed 46 of drying zone 41 defined by a lower drying baffle 48.

A drying gas 108 can enter the drying zone 41 via nozzle 50 and can flow downwardly through an annulus 52 defined by the wall of vessel 10 and the outside of lower drying baffle 48. Annulus 52 can distribute the drying gas 108 around the circumference of central dense bed 46 of drying zone 41. The drying gas can take up moisture as it passes upwardly through drying zone 46. Pressure drop provided by annulus 45 can force the majority of the upward flowing drying gas 108 into an annulus 54. The space within the inside of the shell of vessel 10 and the outside of upper drying baffle 44 can define annulus 54. At least a portion of the moisture laden drying gas 108 can be passed from of annular space 54 into baffle system 38. Control of the flow of drying gas 108 into baffle system 38 can be regulated by restricting the flow area from space 54 into the baffle system 38. The drying zone 41 tends to utilize more drying gas 108 than is necessary to supply oxygen to the combustion section via the chlorination zone 200. Therefore, the excess portion of the drying gas 108 can be removed through nozzle 56.

Dried catalyst particles from drying zone 41 can continue to pass downwardly into a cooling zone 58. An upper cooling baffle 59 and a conical cooling baffle 60 with a central cylindrical portion 61 can receive dried catalyst particles from drying zone 41 and hold dried catalyst particles in an annulus 62 defined between cylindrical portion 61 and the inside of upper cooling baffle 59. A central dense bed of dried catalyst 67 can be defined by a central portion of a drying baffle 64. The central dense bed of dried catalyst 67 can receive catalyst from annulus 62. A cooling gas 110 can enter the cooling zone 58 through a nozzle 66 and can flow downwardly through an annular space 68 to distribute cooling gas over the entire perimeter of the dense bed cooling zone. Cooling gas 110 can flow upwardly through the dense bed 67, and a pressure drop created by the buildup of catalyst particles in annular space 62 can divert the majority of the cooling gas 110 into an annular space 70. A nozzle 72 can withdraw the cooling gas 110 from the cooling zone 58. Cooled catalyst particles from the cooling zone can pass downwardly, around a conical baffle 74, and can exit the regeneration vessel 10 through nozzle 13.

Figure 3:
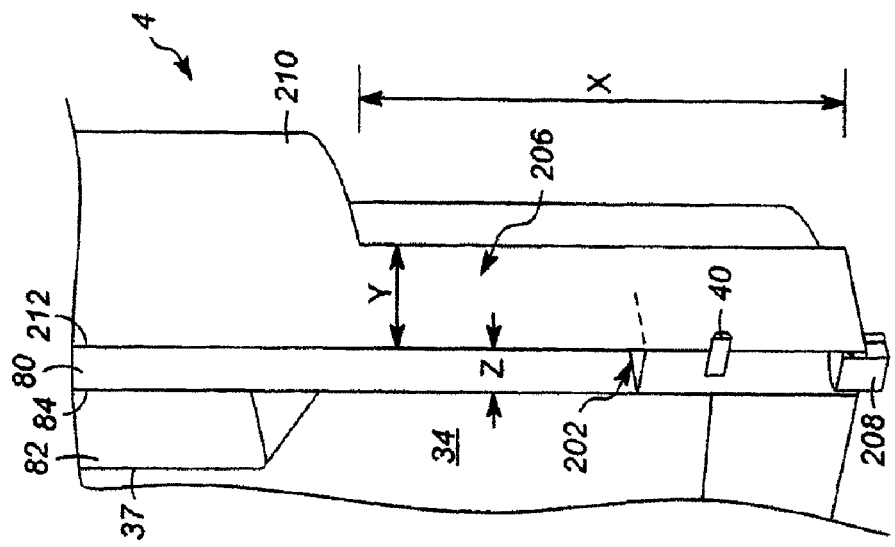
FIG. 3 illustrates a detail view of section 3 of the chlorination zone of FIG. 2.
Figure 2:
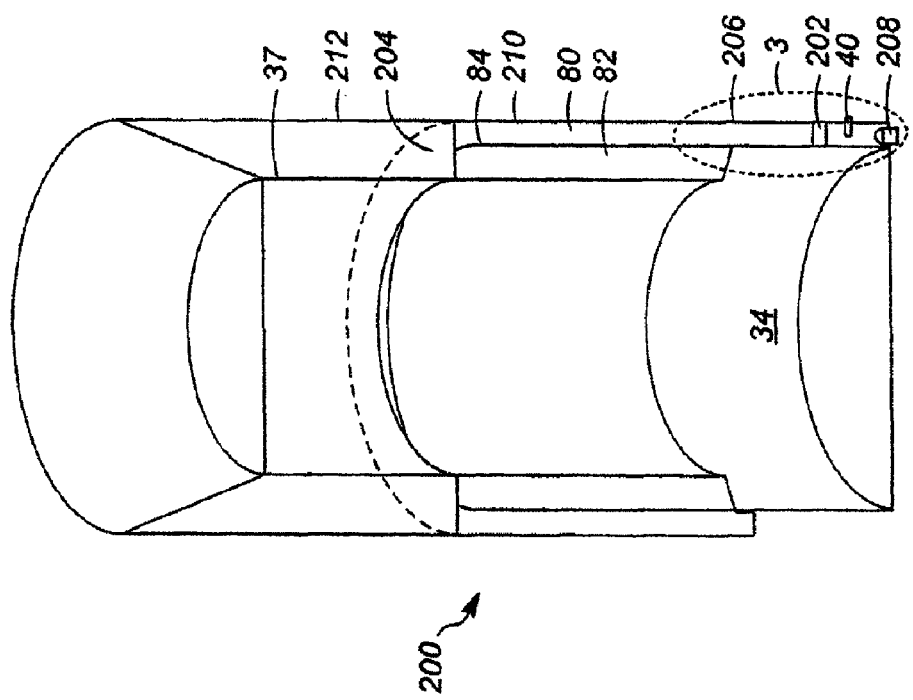
FIG. 2 illustrates an enlarged view of the chlorination zone of the catalyst regeneration vessel of FIG. 1.

Detail views of the chlorination zone 200 are illustrated in FIGS. 2 and 3. The chlorination zone 200 can be generally cylindrical, and can include catalyst bed 34 in the center of the chlorination zone 200, an outer mixing chamber 80 at the outer edge of the chlorination zone 200, and an inner mixing chamber 82 interposed between the catalyst bed 34 and the outer mixing chamber 80. Moisture containing drying gas can be injected into chlorination zone 200 through at least one air nozzle 208. The drying gas can be injected into an outer mixing chamber 80 of the chlorination zone 200, and can flow upwardly through the outer mixing chamber 80. The at least one chlorine input nozzle 40 can preferably inject the chlorine input stream into direct contact with the drying gas. As discussed above, the regeneration vessel 10 can have two chlorine input nozzles 40, preferably located on opposite sides of the regeneration vessel. In such examples, the regeneration vessel preferably also includes two air nozzles 208, which can also be located at opposite sides of the regeneration vessel, at an angle of about 180° from each other. Preferably, each air nozzle 208 is located directly beneath a chlorine input nozzle 40.

The outer mixing chamber 80 and an inner mixing chamber 82 can be defined by the downwardly extending chlorination zone wall 37, an outer wall 212, and an upwardly extending chlorination wall 84 that can be interposed between the downwardly extending chlorination zone wall 37 and the outer wall 212. The inner mixing chamber 82 can preferably be annular.

The outer mixing chamber 80 can have a lower portion 206 and an upper portion 210. The at least one air nozzle 208 can be located at the bottom of the lower portion 206, and the at least one chlorine input nozzle 40 can be located above, preferably directly above, the air nozzle 108. The upper portion 210 of the outer mixing chamber 80 is preferably annular, and has a circumference within the regeneration vessel 10. The lower portion 206 of the outer mixing chamber 80 can have a height X, a width Y, and a length Z. The lower portion 206 is preferably not annular, and the width y of the lower portion 206 is preferably less than half of the circumference of the upper portion 210. The width y can be measured as an arc. The length Z of the outer mixing chamber extends from the outer wall 212 to the upwardly extending chlorination wall 84.

A first baffle 202 can be located above the chlorine input nozzle 40, and can be within the lower portion 206 of the outer mixing chamber 80. The first baffle 202 can have a length that is equal to the length Z of the lower portion 206 of the outer mixing chamber. The first baffle can have a length that is less than the length Y of the lower portion 206 of the outer mixing chamber 80, and can preferably have a length that is less than or equal to about half of the length Y of the lower portion 206 of the outer mixing chamber 80. The first baffle 202 can be a metal plate, and can be flat or curved.

A second baffle 204 can be located above upwardly extending chlorination wall 84. The second baffle 204 can be annular, and can extend from the outer wall 212 to the downwardly extending chlorination wall 37. The second baffle 204 can be a metal plate, and can be flat or curved.

In practice, contact between the drying gas and the chlorine input gas streams in the lower portion 206 of the outer mixing chamber 80 causes rapid mixing to form the chlorination gas. Once they come in contact due to the injection of the chlorine input gas, the drying gas and the chlorine input gas can encounter the first baffle 202, which can facilitate the mixing of the two gases. The volume of the two mixing gas streams tends to increase as they rise through the outer mixing chamber 80, and can expand within the annular area of the upper portion 210 of the outer mixing chamber 80. The two mixed gas streams can then encounter the second baffle 204, and can be directed downwardly into the inner mixing chamber 82 and into contact with the catalyst bed 34 of the chlorination zone 200. While not being bound by any particular theory, it is believed that the second baffle 204 can act to control the swelling, or volume increase, of the mixed gases, and reduce the amount of disturbance to the catalyst bed 34.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A chlorination zone in a catalyst regeneration vessel, the chlorination zone comprising:
    an outer mixing chamber at an outer edge of the chlorination zone, the outer mixing chamber including a lower portion and an upper portion, the lower portion of the outer mixing chamber including at least one air nozzle that injects a drying air stream into the outer mixing chamber, at least one chlorine input nozzle that injects a chlorine input stream into the outer mixing chamber, and at least a first baffle, wherein the upper portion of the outer mixing chamber is annular and has a circumference and wherein the lower portion of the outer mixing chamber has a width that is less than half of the circumference of the upper portion;
    a catalyst bed in a center of the chlorination zone; and
    an inner mixing chamber interposed between the outer mixing chamber and the catalyst bed.

2. A chlorination zone in a catalyst regeneration vessel, the chlorination zone comprising:
    an outer wall;
    a downwardly extending chlorination zone wall;
    an upwardly extending chlorination wall that is interposed between the downwardly extending chlorination zone wall and the outer wall;
    an outer mixing chamber defined by the outer wall and the upwardly extending chlorination wall, the outer mixing chamber including a lower portion and an upper portion, the lower portion of the outer mixing chamber including at least one air nozzle that injects a drying air stream into the outer mixing chamber, at least one chlorine input nozzle that injects a chlorine input stream into the outer mixing chamber, and at least a first baffle;
    an inner mixing chamber defined by the downwardly extending chlorination wall and the upwardly extending chlorination wall; and
    a second baffle located above upwardly extending chlorination wall
    wherein the upper portion of the outer mixing chamber is annular and has a circumference wherein the lower portion of the outer mixing chamber has a width that is less than half of the circumference of the upper portion.

* * * * *